UNITED STATES PATENT OFFICE.

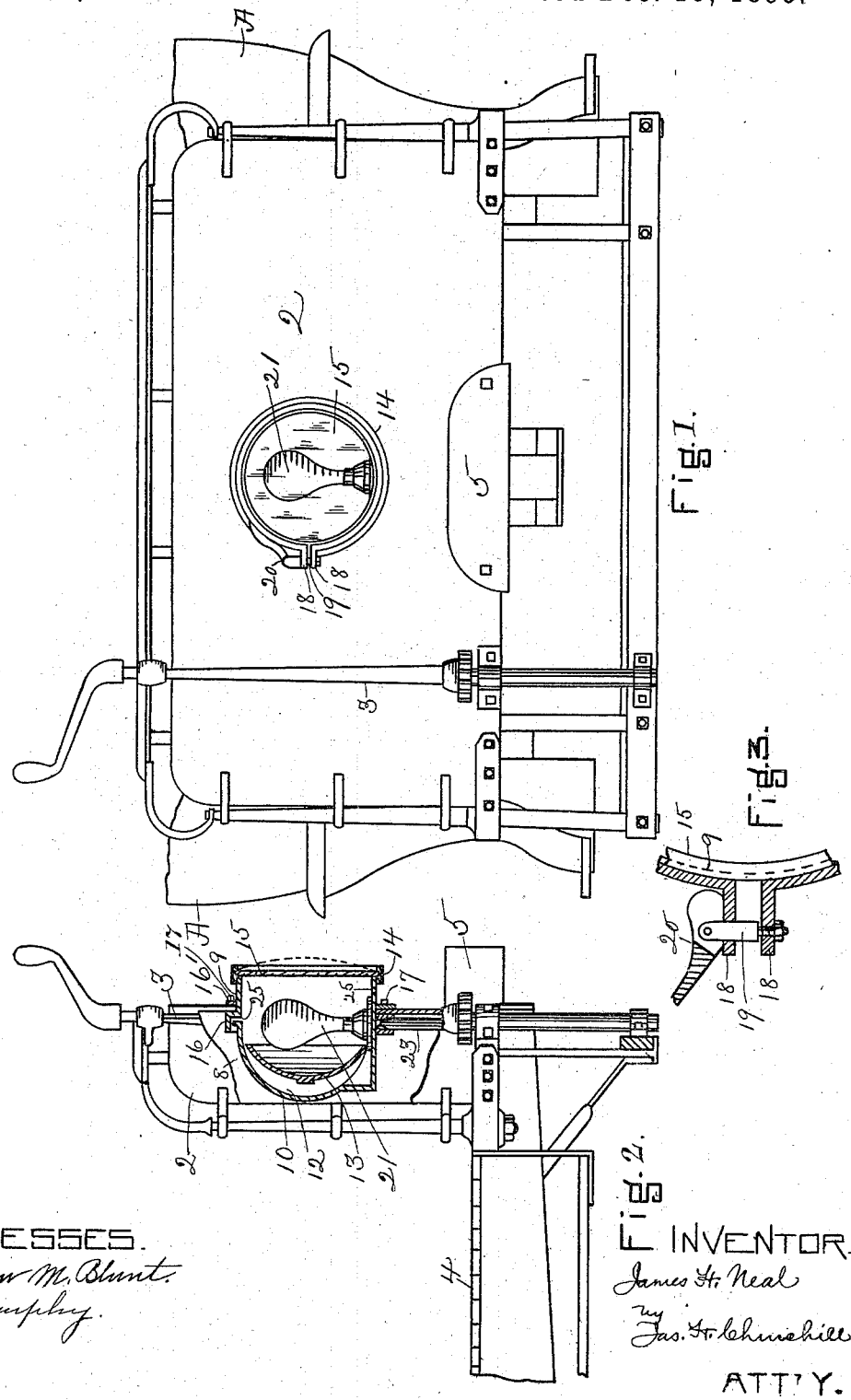

JAMES H. NEAL, OF BOSTON, MASSACHUSETTS, ASSIGNOR TO FRANKLIN E. HUNTRESS, OF SOMERVILLE, MASSACHUSETTS.

HEADLIGHT FOR ELECTRIC CARS.

SPECIFICATION forming part of Letters Patent No. 573,283, dated December 15, 1896.

Application filed July 10, 1895. Serial No. 555,517. (No model.)

*To all whom it may concern:*

Be it known that I, JAMES H. NEAL, a citizen of the United States, residing at Boston, in the county of Suffolk and State of Massachusetts, have invented certain new and useful Improvements in Headlights for Electric Cars; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to a headlight for railway-cars of that class provided at its opposite ends with a solid upright frame or dashboard usually made of one continuous plate or sheet of metal, and is especially applicable to railway-cars of the class referred to, which are propelled by electricity.

Prior to this invention it has been customary to provide railway-cars of the class described with a headlight consisting of a casing containing a lamp and a reflector located behind the lamp, the said casing being hung or suspended from the top of the dashboard by suitable straps, which embrace or fit over the dashboard, so that the headlight is detachably secured to said dashboard and can be readily removed therefrom to permit the car to be used in the daytime without carrying the headlight, which, as now commonly constructed, is unsightly and highly objectionable, and also to permit the said headlight to be detached from one dashboard and to be attached to the dashboard at the opposite end of the car when the direction of travel of the car is reversed.

In order to obtain a proper lighting of the track in front of the car, including both rails and the road-bed between the said rails, the reflector is located behind the lamp at or near its focus, which requires the casing of the headlight to be made of considerable depth or length, which is objectionable, as the said casing, when attached to the dashboard, projects in front of the car beyond the bunter, with which such cars are usually provided, and in case of collision between two cars or between a car and a wagon the headlight receives the full force of the collision, and is usually destroyed or damaged to such extent as to render it worthless and unfit for further use.

When the car is propelled by electricity, the headlight is provided with an incandescent lamp supplied with current from the trolley-wire and connected in circuit with the lamps which light the interior of the car.

As now commonly practiced, the lamp of the headlight is connected in circuit with the lamps within the car by a flexible cord, which is detachably connected with the lamp in the headlight.

This invention has for its object to provide railway-cars of the class referred to with a headlight which is carried by the dashboard in a manner, as will be described, as will overcome the objectionable features above referred to and permit the said headlight to be permanently secured to the dashboard without danger of injury by collision and without rendering the front of the car unsightly in the daytime, and also without covering any of the lettering usually placed upon the dashboard to designate the route of the car.

The invention further has for its object to provide electrically-propelled cars of the class referred to with a headlight permanently secured to the dashboard and connected in circuit with the lamps in the car in such manner as will avoid the objectionable features attending the use of a flexible and detachable connection, as now commonly used and above referred to.

These various objects I am enabled to accomplish by providing the dashboard with a hole or opening of such size as will permit of the reception of the rear portion or end of the light-containing casing and thereby permit the said casing to be permanently secured to the dashboard and yet be made of the desired or required length to obtain the proper lighting of the track, as will be described, without projecting in front of the dashboard such a distance as will render it liable to destruction in case of collision, the said casing, when secured to the dashboard, increasing the strength of the same. These and other features of this invention will be pointed out in the claims at the end of this specification.

Figure 1 is a front elevation of a sufficient portion of a railway-car provided with a dashboard having a headlight permanently secured thereto to enable this invention to be understood. Fig. 2 is a vertical section and elevation of the parts shown in Fig. 1, the dashboard and the headlight being shown in section; and Fig. 3, a detail to be referred to.

Referring to Fig. 1, A represents the body of a car provided at its opposite ends with platforms 4 and with solid dashboards or upright frames 2, usually made of one continuous plate or sheet of metal, erected upon the said platforms and extended from side to side of the said platform to form a closed end for the same, only one end of the said car being herein shown, the said parts being of any usual or suitable construction such as now employed on street-railways.

The car is provided, as shown, with the usual brake-rod 3 and with the bunter 5, secured to the car-platform and projecting in front of the dashboard.

In accordance with this invention the solid upright frame or dashboard 2, which is usually made of one continuous plate or piece of sheet-iron, is provided substantially at its center with an opening preferably located above and in line with the bunter 5 and intermediate of the sides and top and bottom of the said dashboard, and which may be made by cutting out a portion of the dashboard 2 of a size as will permit of the reception of the rear end or portion of the casing 8 of a headlight, and preferably the said opening will be made of a diameter substantially equal to the diameter of the casing 8, the body portion 9 of which for the best results is made of cylindrical shape and open at its front end and closed at its rear end 10, which latter may be provided on its inner side with a reflecting-surface 12, if desired, or the rear end of the chamber formed by the casing 8 may contain within it a parabolic or other reflector 13, secured in said casing in any suitable manner.

The body 9 and the rear end 10 of the casing 8 may and preferably will be made of metal and cast in one piece, and the front end of the casing, which is normally open, is closed by a transparent medium, such as a plate or disk 15, of glass, of flat shape, or made in the form of a lens, as indicated by dotted lines, Fig. 1, the said glass being preferably attached to the casing by means of a clamping annular ring 14, having its ends provided with ears 18, united by means of a bolt 19, fast to one ear and sliding through the other ear (see Fig. 3) and connected to a cam-lever 20, by turning which the ears 18 may be brought together to clamp the ring 14 onto the body portion 9 of the casing. The casing 8 is permanently secured to the dashboard with its front or glass-containing end located on the front side of the dashboard and with its rear end located on the back or rear side of the dashboard, and this permanent attachment may and preferably will be accomplished by providing the body portion 9 of the casing with an annular web or flange 16, which in the present instance makes contact with the back side of the dashboard, and by means of a removable ring 16', which fits over the front end of the casing and is secured to the dashboard and to the ring 16 by bolts 17.

The dashboard is materially increased in strength when the headlight-casing is permanently secured thereto.

The casing 8 contains within it a lamp 21, which in the present instance is represented as an incandescent lamp, the rays of which are focused on the reflector 13 and are transmitted or reflected back through the glass front 15 as a solid unbroken body of light, which illuminates in a highly satisfactory manner both rails of the track and the road-bed between the same, the opening in the dasher permitting the rear end of the light-containing casing to be extended preferably a sufficient distance from the rear or back side of the dasher as will permit the reflector to be placed in the focus of the lamp and yet have the front portion of the casing project a minimum distance from the front side of the dashboard, so that the said headlight projects in front of the dashboard a less distance than the bunter 5. Danger of breaking or otherwise injuring the headlight from collisions is thus avoided or reduced to a minimum, and the objections raised against permanently carrying the old style of headlight on the dashboard as above set forth are entirely removed, and a neat and effective headlight permanently secured to the dashboard is obtained.

The wires or conductors joined to the terminals of the lamp 21 and not herein shown are led into the casing 8 through a short metal pipe 23, extended through or resting on the platform 4, and the said pipe protects the conductors or wires from injury and from atmospheric influences.

To prevent the glass 15 from sweating, air-apertures 25 are made in the casing, which permit of the circulation of air through the said casing and thus convey away the hot air and prevent the casing from becoming heated. The electric lamp of the headlight is included in the circuit of the lamps within the car, and may be controlled by a suitable switch, (not shown,) which will include the lamp of the headlight on one dashboard, and cut out the lamp of the headlight on the other dashboard, under the present plan of lighting electric cars on systems employing a current of five hundred volts, five lamps of one hundred volts being lighted at one time and usually four lamps being located within the car.

The headlight herein shown has been described as permanently secured to the dashboard in contradistinction to one designed to be detached from the dashboard at the end of the route, and by the term "permanent" I desire to be understood as meaning a headlight which remains a fixed part of the dashboard after once being secured thereto.

By providing the casing with a removable cover at one end access to the interior of the said casing may be had for repairs or other purposes. Furthermore, it will be seen that by providing the solid dashboard with a hole substantially central with relation to the tracks upon which the car runs and intermediate of its sides and the top and bottom of the same and permanently securing the lamp-containing casing to the dashboard with its rear portion located in line with the said opening on the back side of the dashboard and its front portion located in front of the dashboard in line with the said opening a practical and desirable headlight for street-railway cars is obtained for the following reasons: First, the front portion of the casing projects in front of the dashboard a minimum distance, thereby avoiding the danger of destruction by collision and removing the objection to permanently carrying headlights during the daytime; second, the casing can be made of the desired length to enable a reflecting-surface to be placed substantially in the focus of the lamp and thereby obtain a solid or unbroken body of light upon the tracks and the road-bed between the same; third, the rear portion of the casing behind the dashboard does not project to such extent as to interfere with the motorman or with the passengers getting on and off of the car; fourth, a sightly and ornamental headlight is obtained which does not detract from the appearance of the front of the car, and, fifth, the dashboard is not weakened, but, on the other hand, is materially strengthened, and in practice the opening is so located with respect to the top and bottom of the dashboard as to leave a continuous unbroken surface above the opening for the reception of the usual lettering indicative of the destination of the car, so that the light may be permanently applied to the dashboards of existing street-cars without objection.

I claim—

1. The combination with the dashboard of a street-railway car forming a continuous front and extended from side to side of the car-platform and provided with a substantially central hole or opening located below the upper edge thereof to leave a continuous unbroken upper surface extended from side to side of the platform, of a headlight permanently secured to the said dashboard in line with said hole or opening and consisting of a light-containing casing having its rear portion located behind the dashboard in line with said opening and its front portion projecting in front of the said dashboard in line with said opening whereby the distance the headlight projects in front of the said dashboard may be reduced to a minimum, substantially as and for the purpose specified.

2. The combination with the solid or continuous sheet-metal dashboard of an electric street-railway car provided with a hole or opening made in the dashboard intermediate of its sides and top and bottom, and substantially central with relation to the tracks upon which the said car travels, of an electrically-illuminated headlight permanently secured to the said dashboard in line with said hole or opening, and consisting of a casing provided within it with an electric lamp and with a reflecting-surface located behind the said lamp substantially in its focus, the said casing being extended through the said hole or opening to reduce to a minimum the distance the front end of the said casing projects in front of the said dashboard, substantially as and for the purpose specified.

3. The combination with the solid or continuous sheet-metal dashboard of a street-railway car having a hole or opening made in the dashboard substantially central with relation to the track upon which said car travels and intermediate of the top and bottom of the dashboard, of an electrically-illuminated headlight permanently secured to the said dashboard and consisting of a light-containing casing closed at its rear end and provided at its front end with a light-transmitting cover removably secured to said casing, the front portion of the said casing being located in front of the dashboard in line with said opening and the rear portion of said casing being located on the back or rear side of said dashboard in line with said opening, substantially as and for the purpose specified.

4. The combination with the solid or continuous sheet-metal dashboard of a street-railway car having a hole or opening made in the dashboard substantially central with relation to the tracks upon which said car travels and located below the top edge of the said dashboard, of a headlight permanently secured to the said dashboard and consisting of a metal casing composed of a substantially cylindrical body portion closed at its rear end and normally open at its front end, a removable transparent cover for the front end, an annular flange on the body portion intermediate of its ends, the said cylindrical body portion projecting through the opening in the dashboard on opposite sides of the same, and a clamping-ring fitted over one end of the casing and secured to the dashboard and to the annular flange on the opposite side of the dashboard, substantially as and for the purpose specified.

5. The combination with the solid or continuous dashboard of a street-railway car having a hole or opening for the reception of a headlight intermediate of its sides and its top and bottom, of the said headlight permanently secured to the said dashboard and consisting of a casing having a body portion closed at its rear end and normally open at its front end, a transparent cover for the normally open front end removably attached to the said casing, the latter having the rear end of its body portion located behind the dashboard in line with the opening therein, and having its front portion projecting in front of the dashboard in line with the opening therein, and means to permanently secure the said casing to the dashboard, substantially as and for the purpose specified.

6. The combination of a car-dashboard having an opening near its center leaving the dashboard unbroken transversely both above and below said opening, with a headlight or lantern bodily set into said opening and attached to the dashboard at points around the edge of the opening therein.

In testimony whereof I affix my signature in presence of two witnesses.

JAS. H. NEAL.

Witnesses:
H. E. LODGE,
C. F. BAKER.